United States Patent
Crean

(10) Patent No.: US 7,021,699 B2
(45) Date of Patent: Apr. 4, 2006

(54) MOTORHOME WITH INCREASED INTERIOR CEILING HEIGHT

(75) Inventor: Johnnie Robert Crean, Chino, CA (US)

(73) Assignee: Alfa Leisure, Inc., Ontario, CA (US)

(*) Notice: Subject to any disclaimer, the term of this patent is extended or adjusted under 35 U.S.C. 154(b) by 0 days.

(21) Appl. No.: 10/776,025

(22) Filed: Feb. 10, 2004

(65) Prior Publication Data

US 2005/0023860 A1 Feb. 3, 2005

Related U.S. Application Data

(63) Continuation of application No. 10/354,259, filed on Jan. 28, 2003, now Pat. No. 6,688,678, which is a continuation of application No. 09/728,946, filed on Dec. 1, 2000, now Pat. No. 6,540,285.

(60) Provisional application No. 60/240,270, filed on Oct. 13, 2000.

(51) Int. Cl.
*B60P 3/00* (2006.01)
(52) U.S. Cl. ..................................... 296/164
(58) Field of Classification Search ................ 296/156, 296/26.13, 176, 175, 165, 164, 37.1, 37.6, 296/204
See application file for complete search history.

(56) References Cited

U.S. PATENT DOCUMENTS

| 986,731 | A | 3/1911 | McGerry |
|---|---|---|---|
| 1,536,518 | A | 5/1925 | Osborn |
| 2,000,477 | A | 5/1935 | Carry |
| 2,089,799 | A | 8/1937 | Hulse |
| 2,150,615 | A | 3/1939 | Sword |
| 2,177,394 | A | 10/1939 | Pierce |
| 2,225,319 | A | 12/1940 | Rollo |
| 2,268,502 | A | 12/1941 | Browne |
| 2,271,158 | A | 1/1942 | Browne |
| 2,463,255 | A | 3/1949 | Elliot |

(Continued)

FOREIGN PATENT DOCUMENTS

CA 2 036 838 3/1992

(Continued)

*Primary Examiner*—H. Gutman
(74) *Attorney, Agent, or Firm*—Knobbe Martens Olson & Bear, LLP

(57) ABSTRACT

A vehicle frame with a low profile is designed to be suitable for attaching directly to an incomplete, preassembled motorized chassis to construct a motorhome. The vehicle frame includes planar bulkheads and a storage area floor that are attached to the frame and to the chassis so as to create a three-dimensional space frame that is highly resistant to bending and twisting forces as well as storage areas that extend the width of the motorhome. The motorhome with the frame mounts a heating, ventilation, and air conditioning (HVAC) system as well as heavy holding tanks within or below the plane of the vehicle frame so as to lower the center of mass of the motorhome to thereby improve vehicle handling and safety. Placement of the HVAC system within and/or below the vehicle frame obviates the need to position HVAC components on the roof of the motorhome thereby further lowering the center of mass and eliminating a source of liquid water condensation above the living space of the motorhome. The vehicle frame attached directly to the chassis further facilitates an interior ceiling height in the motorhome of at least 7'6" while maintaining a total vehicle height not exceeding 13'6" as well as facilitating construction of slide-out rooms with interior heights of at least 6'1" thereby allowing adults of above average height to stand up inside the slide-out rooms.

6 Claims, 6 Drawing Sheets

U.S. PATENT DOCUMENTS

| | | | |
|---|---|---|---|
| 2,639,187 A | 5/1953 | Grumbache |
| 2,704,223 A | 3/1955 | Houdart |
| 2,846,263 A | 8/1958 | La Rue |
| 2,876,035 A | 3/1959 | Houdart |
| 3,019,047 A | 1/1962 | Ahrens |
| 3,106,750 A | 10/1963 | Jarman |
| 3,165,350 A | 1/1965 | Willson |
| 3,237,545 A | 3/1966 | Gillick et al. |
| 3,254,914 A | 6/1966 | Steck |
| 3,287,058 A | 11/1966 | Wells |
| 3,308,738 A | 3/1967 | Heimann |
| 3,343,473 A | 9/1967 | Gillick et al. |
| 3,363,231 A | 1/1968 | Grosgebauer et al. |
| 3,565,480 A | 2/1971 | McCollum et al. |
| 3,566,614 A | 3/1971 | Imral |
| 3,572,809 A | 3/1971 | Buland |
| 3,719,386 A | 3/1973 | Puckett et al. |
| 3,735,998 A | 5/1973 | Green |
| 3,740,088 A | 6/1973 | Ratcliff |
| 3,895,726 A | 7/1975 | Rassieur |
| 3,915,492 A | 10/1975 | Agnese |
| 3,959,985 A | 6/1976 | Schulze, Sr. |
| 3,962,885 A | 6/1976 | Schoenbachler et al. |
| 3,989,119 A | 11/1976 | Cady |
| 4,049,312 A | 9/1977 | Rudbeck |
| 4,082,882 A | 4/1978 | Weinstein et al. |
| 4,106,732 A | 8/1978 | Whiting |
| 4,109,954 A | 8/1978 | Wall |
| 4,147,379 A | 4/1979 | Winslow |
| 4,181,347 A | 1/1980 | Clark |
| 4,232,884 A | 11/1980 | DeWitt |
| 4,457,554 A | 7/1984 | Fuisz et al. |
| 4,468,823 A | 9/1984 | Tounjian |
| 4,480,866 A | 11/1984 | Komatsu |
| 4,500,132 A | 2/1985 | Yoder |
| 4,531,453 A | 7/1985 | Warman et al. |
| 4,550,946 A | 11/1985 | Hanemaayer |
| RE32,262 E | 10/1986 | Stewart |
| 4,652,041 A | 3/1987 | Barber et al. |
| 4,653,125 A | 3/1987 | Porter |
| 4,659,132 A | 4/1987 | Day |
| 4,724,748 A | 2/1988 | Geyer |
| 4,728,144 A | 3/1988 | Crean |
| 4,729,594 A | 3/1988 | Hoff |
| 4,746,164 A | 5/1988 | Crean |
| 4,772,063 A | 9/1988 | Amy |
| 4,776,631 A | 10/1988 | Sargent et al. |
| 4,863,189 A | 9/1989 | Lindsay |
| 4,935,599 A | 6/1990 | Babin et al. |
| 4,953,449 A | 9/1990 | Jackson |
| 4,955,661 A | 9/1990 | Mattice |
| 4,957,323 A | 9/1990 | Johnson |
| 4,971,355 A | 11/1990 | Studdard |
| 5,028,072 A | 7/1991 | Lindsay |
| 5,061,001 A | 10/1991 | Madden et al. |
| 5,066,067 A | 11/1991 | Ferdows |
| 5,090,749 A | 2/1992 | Lee |
| 5,112,082 A | 5/1992 | Clelland |
| 5,143,418 A | 9/1992 | Fouquet |
| 5,184,976 A | 2/1993 | Babin |
| 5,237,782 A | 8/1993 | Cooper |
| 5,242,185 A | 9/1993 | Carr et al. |
| 5,248,005 A | 9/1993 | Mochizuki |
| 5,263,894 A | 11/1993 | Hirakawa et al. |
| 5,291,701 A | 3/1994 | Delacollette et al. |
| 5,307,645 A | 5/1994 | Pannell |
| 5,314,205 A | 5/1994 | Glesmann |
| 5,389,035 A | 2/1995 | Ishida et al. |
| 5,401,050 A | 3/1995 | Baker |
| 5,403,063 A | 4/1995 | Sjostedt et al. |
| 5,439,415 A | 8/1995 | Hirikawa et al. |
| 5,501,504 A | 3/1996 | Kunz |
| 5,567,003 A | 10/1996 | Gill |
| 5,575,453 A | 11/1996 | Dion |
| 5,577,351 A | 11/1996 | Dewald, Jr. et al. |
| 5,620,224 A | 4/1997 | DiBiagio et al. |
| 5,658,032 A | 8/1997 | Gardner |
| 5,673,962 A | 10/1997 | Maieli et al. |
| 5,706,616 A | 1/1998 | Fernandez |
| 5,743,701 A | 4/1998 | Green |
| 5,746,473 A | 5/1998 | Crean |
| 5,785,373 A | 7/1998 | Futrell et al. |
| 5,788,306 A | 8/1998 | DiBiagio et al. |
| 5,791,715 A | 8/1998 | Nebel |
| 5,791,726 A | 8/1998 | Kaufman |
| 5,800,002 A | 9/1998 | Tiedge et al. |
| 5,833,294 A | 11/1998 | Williams et al. |
| 5,863,070 A | 1/1999 | Williams et al. |
| 5,894,698 A | 4/1999 | Dewald, Jr. et al. |
| 5,902,001 A | 5/1999 | Schneider |
| 5,915,774 A | 6/1999 | Tiedge |
| 5,921,615 A | 7/1999 | Gimenez |
| 5,934,026 A | 8/1999 | Green |
| 6,048,016 A | 4/2000 | Futrell et al. |
| 6,098,346 A | 8/2000 | Miller et al. |
| 6,108,983 A | 8/2000 | Dewald, Jr. et al. |
| 6,158,794 A | 12/2000 | Flanagan |
| 6,170,903 B1 | 1/2001 | Crean |
| 6,182,401 B1 | 2/2001 | McManus et al. |
| 6,202,362 B1 | 3/2001 | McManus et al. |
| 6,224,126 B1 | 5/2001 | Martin et al. |
| 6,227,607 B1 | 5/2001 | Dewald, Jr. et al. |
| 6,231,115 B1 | 5/2001 | Crean |
| 6,257,638 B1 | 7/2001 | Graber |
| RE37,351 E | 9/2001 | Crean |
| 6,290,284 B1 | 9/2001 | Crean |
| 6,293,612 B1 | 9/2001 | Crean |
| 6,302,475 B1 | 10/2001 | Anderson |
| 6,343,830 B1 | 2/2002 | Ingram et al. |
| 6,345,854 B1 | 2/2002 | McManus |
| 6,416,116 B1 | 7/2002 | Stanton et al. |
| 6,447,048 B1 | 9/2002 | Crean |
| 6,527,324 B1 | 3/2003 | McManus et al. |
| 6,540,285 B1 | 4/2003 | Crean |
| 6,565,144 B1 | 5/2003 | Crean |
| 6,688,678 B1 * | 2/2004 | Crean ..................... 296/204 |

FOREIGN PATENT DOCUMENTS

| | | |
|---|---|---|
| CH | 353 262 | 5/1961 |
| EP | 0063008 | 10/1981 |
| EP | 0148559 | 7/1985 |
| EP | 0239548 | 9/1987 |
| GB | 616274 | 1/1949 |
| GB | 2 088 789 | 6/1982 |
| IT | 478 931 | 3/1953 |

* cited by examiner

MOTORHOME WITH INCREASED INTERIOR CEILING HEIGHT

RELATED APPLICATIONS

This application is a continuation of U.S. application Ser. No. 10/354,259, filed Jan. 28, 2003 now U.S. Pat. No. 6,688,678, entitled "MOTORHOME WITH INCREASED INTERIOR CEILING HEIGHT" which is a continuation of U.S. application Ser. No. 09/728,946, filed Dec. 1, 2000, issued as U.S. Pat. No. 6,540,285 on Apr. 1, 2003, entitled "MOTORHOME WITH INCREASED INTERIOR CEILING HEIGHT"0 and claims the benefit of the U.S. Provisional Application No. 60/240,270, filed Oct. 13, 2000, entitled "LOW PROFILE VEHICLE FRAME", all of which are hereby incorporated by reference in their entireties.

BACKGROUND OF THE INVENTION

1. Field of the Invention

The present invention relates to the field of vehicle frames and, in particular, to a high-strength frame suitable for motorhome construction which enables a greater interior ceiling height.

2. Description of the Related Art

Recreational vehicles (RVs) have become an increasingly popular and common means of recreation. RVs are vehicles that include a living space inside and can be either self-propelled, as in a motorhome, or can depend on another vehicle for their motive power, as in campers or trailers. RVs typically provide sleeping areas, cooking facilities, and self-contained water supplies and toilet facilities. More elaborate RVs can include refrigerator/freezer units, showers and/or bathtubs, air conditioning, heaters, built in generators and/or power inverters, televisions, VCRs, and clothes washers and dryers. RVs provide many of the amenities of a residential home while on the road away from home and are popular for this, reason. RV users will typically use the RV to travel to a recreational area and live in the RV for some period of time. It is not unusual for people, particularly retired persons, to use an RV as their primary residence. RV users often have families with children and, as their trips are often of a recreational nature, will often invite friends or family along on the trip.

It can be understood that since an RV will often be used by a large number of people and often for an extended period of time, the RV manufacturers and customers will seek as many amenities and as much interior living space as possible. A major goal of RV manufacturers and their customers is to maximize the amount of usable living space inside their RVs. However, the overall size of an RV is limited both by vehicle code regulations and by practical limitations on what is reasonable to drive and maneuver. Vehicle codes restrict the maximum height, width, and length of vehicles that may be driven on public roads. Also, as a vehicle increases in size, it becomes increasingly difficult to drive and can become physically too large to pass through locations that the driver may wish to go. In addition, as the RV gets physically larger, more fuel is required to move it, which increases the cost of operation. Accordingly, many RVs are provided with slide-out room structures which are extensible so as to increase the RV's footprint and interior living space once the vehicle comes to rest.

An additional design constraint on the construction and design of RVs is their overall weight. Since an RV is intended to be mobile, either an integral power plant is provided, as in the case of motorhomes, or a tow vehicle is used to pull or carry the RV, as in the case of trailers or campers, respectively. The engine and drive-train of any motive source has an upper design limit on the weight it is capable of moving. In addition, the chassis, suspension, wheels, and brakes of a motorhome or tow vehicle also have upper design limits as to how much weight they can safely accommodate. These weight limits are established after careful engineering analysis and the weight ratings are endorsed and enforced by responsible governmental agencies. Exceeding the established weight limits of a power-train or chassis component can lead to excessive wear and failure, unacceptable performance, and exposure to liability in case of an accident.

A particular issue with the weight of a motorhome is its distribution along a vertical axis. The distance of the vehicle's center of mass from the road surface has a dramatic effect on the handling characteristics of the vehicle. The closer the center of mass is to the road surface, the shorter the moment arm between the center of mass and the roll axis of the vehicle. The shorter the moment arm between the center of mass and the roll axis of the vehicle, the less tendency the vehicle will have to lean in turns. Leaning in turns is uncomfortable for the occupants and typically places uneven loads on the tires and suspensions, compromising turning ability. For these reasons, race cars, for example, are typically built to ride as low to the ground as possible. Motorhomes, typically being quite tall, often exhibit significant leaning in turns. Obviously, the uses and requirements for an RV are quite different than those of a race car, however, within the height available in a motorhome, the weight should be concentrated as low as possible. For this reason, heavy items, such as generators, storage and holding tanks for water and fuel, and the engine are optimally placed low in the chassis.

Since RVs are mobile structures, they are typically exposed to the stresses of driving over roads that are in places quite rough. In addition, an RV will often have to travel over some distance of dirt surface to reach a camping space. Since an RV is typically used outdoors, it is exposed to the stresses of inclement weather and high winds. It can be appreciated that structural integrity is highly desired in an RV. However, the weight and size limitations previously mentioned place a limit on the strength of an RV. Accordingly, RVs are constructed to be as strong, but as light as possible.

The chassis of a motorhome is typically constructed on a preassembled steel ladder frame chassis. The chassis is a partially complete vehicle and is generally procured from a manufacturer such as FREIGHTLINER™ or FORD MOTOR COMPANY™. The chassis typically consists of two parallel frame rails extending the length of the chassis and interconnected with several perpendicular cross-braces to form a ladder frame. An engine, transmission, and fuel tank(s) are generally placed between the frame rails near one end. Suspension, steering, brake, and road wheel assemblies are attached outboard of the frame rails.

The coach bodywork, which provides and encloses the living space of the motorhome, is typically made from a laminate that can include light gauge sheet metal, plywood, vinyl, and insulation. The laminate is built to be strong, lightweight, weather resistant, and durable. The coach bodywork may also include a supporting framework. The floor of the coach typically rests indirectly on the chassis frame and the vertical walls extend upwards from the floor. The roof of the coach rests on and depends on the vertical walls of the body for structural support.

A completed motorhome may be up to 45' long and 13'6" high in most states. The chassis is generally on the order of 1' high and is elevated some distance above the ground by the suspension and wheels to provide ground clearance for suspension movement and clearing obstacles in the road. The interior flooring in current art motorhomes is typically elevated a significant amount above the upper face of the chassis in order to facilitate installing ancillary equipment. In addition, many prior art motorhomes route cooling or heating air ducts adjacent the roof structure or mount air-conditioning units on the roof. Under the overall height limit previously mentioned, these structures in or on the roof intrude into the available interior height envelope and limit the usable interior vertical space. Current motorhomes typically offer interior ceiling heights of 6'9" or less. The slide-outs in current art motorhomes do not typically provide sufficient room inside for adults to stand upright. As the slide-out area is a living space in the extended position, it can be appreciated that to be forced to stoop or crouch inside the slide-out is an inconvenience for the users of such motorhomes.

Placement of air conditioning units and/or ducting in the roof creates a further difficulty with water condensation. As air conditioning units cool air below the ambient temperature, it will be appreciated that in many conditions the temperature of the air conditioning unit and ducting carrying the cooled air will be below the ambient dew point and, thus, liquid water will condense on the cool surfaces. If these cool surfaces are located above living areas of the motorhome, as is the case with many current designs, the liquid water can be readily drawn by gravity into the interior of the motorhome. It will be appreciated that liquid water intruding into the interior of the motorhome is an annoyance at best and can damage the structural integrity of interior structures as well staining or warping interior finishings. Liquid water can also irreparably damage electronic equipment, such as laptop computers, televisions, and VCRs, such as would often be located in the interior of a motorhome.

An additional difficulty arises with motorhomes of the construction described above when the vehicle drives over rough terrain. Motorhomes are essentially rectangular and are thus susceptible to twisting deflection as opposed to a triangulated structure. Motorhomes of the construction described above are not particularly strong under torsional forces such as arise when one corner of the vehicle drops or rises compared to the others, for example when a wheel drops into a pothole or rut or the vehicle drives over a curb or speed bump at an angle. Such maneuvers "cross-up" the rectangular frame and impose twisting forces. These forces, exerted over the relatively large dimensions of a typical motorhome, can cause significant displacement in the coach. This can cause cracks to appear in the coach, jam door and window openings, dislodge interior fitments, and generally cause wear and tear on the vehicle.

From the foregoing, it can be appreciated that there is a continuing need for a stronger motorhome coach construction that also provides increased interior living space. The structure should not add an excessive amount of weight to the motorhome and should also maintain a low center of gravity to benefit vehicle handling characteristics. The design should position the air conditioning system in such a way that water that condenses out during use does not intrude into the interior of the motorhome.

SUMMARY OF THE INVENTION

The aforementioned needs are satisfied by the present invention, which in one aspect is a vehicle frame comprising: a plurality of parallel, elongate rail members extending the length of the frame; a plurality of parallel, elongate cross-tie members arranged perpendicular to the rail members and interconnecting the rail members so as to define a chassis plane and a floor plane; and a plurality of rigid planar members fixedly attached along a first edge to the cross-tie and rail members so as to extend downwards from the chassis plane wherein the interconnected rail, cross-tie, and planar members together define a three dimensional space frame. In one embodiment, the vehicle frame further comprises a rigid bottom floor panel substantially parallel to the chassis plane and attached to a second edge of the planar members opposite the first edge. The interconnected elongate rail members, cross ties, planar members, and bottom floor panel together define a closed, structural box structure. The interconnected planar members and bottom floor panel also define storage areas that extend substantially the width of the vehicle frame.

In one particular embodiment of the invention, the planar members are folded along edges of the planar members such that a portion of the planar members extend substantially perpendicular to the plane of the planar members so as to define attachment areas of the planar members and further so as to increase the stiffness of the planar members. In another aspect, the floor plane and the chassis plane are separated by approximately the width of the elongate rail members and the elongate cross-tie members so as to define a floor that is positioned adjacent the chassis.

Another aspect of the invention is a recreational vehicle comprising: a chassis; a frame attached to a top face of the chassis; and a plurality of planar bulkheads attached along first edges to a bottom face of the low profile frame and along second edges to sides of the chassis such that the planar bulkheads extend downwards from the chassis and low profile frame thereby defining a three-dimensional space frame. In one embodiment, the recreational vehicle further comprises a planar, rigid storage area floor attached to second edges of the planar bulkheads opposite the first edges such that the interconnection of the vehicle frame, the planar bulkheads, and the storage area floor to the chassis encloses the chassis thereby defining a space frame structure surrounding and including the chassis. In one embodiment, the chassis is a split-level chassis. The interconnection of the planar bulkhead and the storage area floor defines storage areas that extend substantially the width of the recreational vehicle. The recreational vehicle further comprises a heating, ventilation, and air conditioning (HVAC) system installed within and/or below the plane of the chassis.

In one embodiment, the recreational vehicle defines an interior living area wherein the vertical height of the interior living area is at least 7'6" tall. The recreational vehicle also includes a slide-out room. The slide-out room defines an interior slide-out height wherein the interior slide-out height is at least 6'1" high.

These and other objects and advantages of the present invention will become more fully apparent from the following description taken in conjunction with the accompanying drawings.

DETAILED DESCRIPTION OF THE PREFERRED EMBODIMENT

Figure 1A:
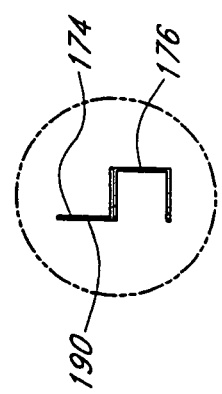
FIG. 1 is an isometric view of a vehicle frame mounted on a preassembled chassis forming the framework for a motorhome with a high interior ceiling with detail 1A showing a cross-section detail.
Figure 1:
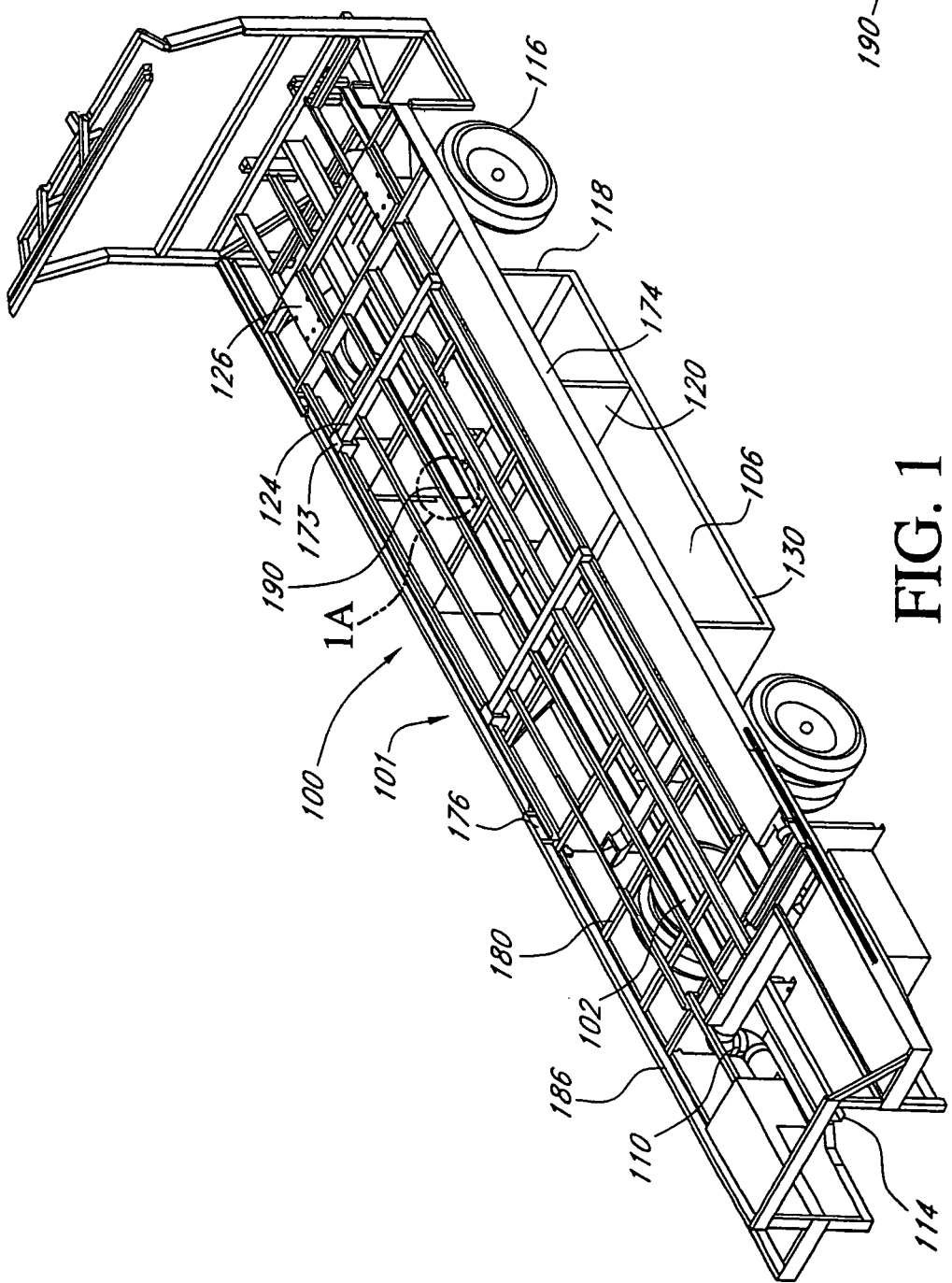
Figure 5:
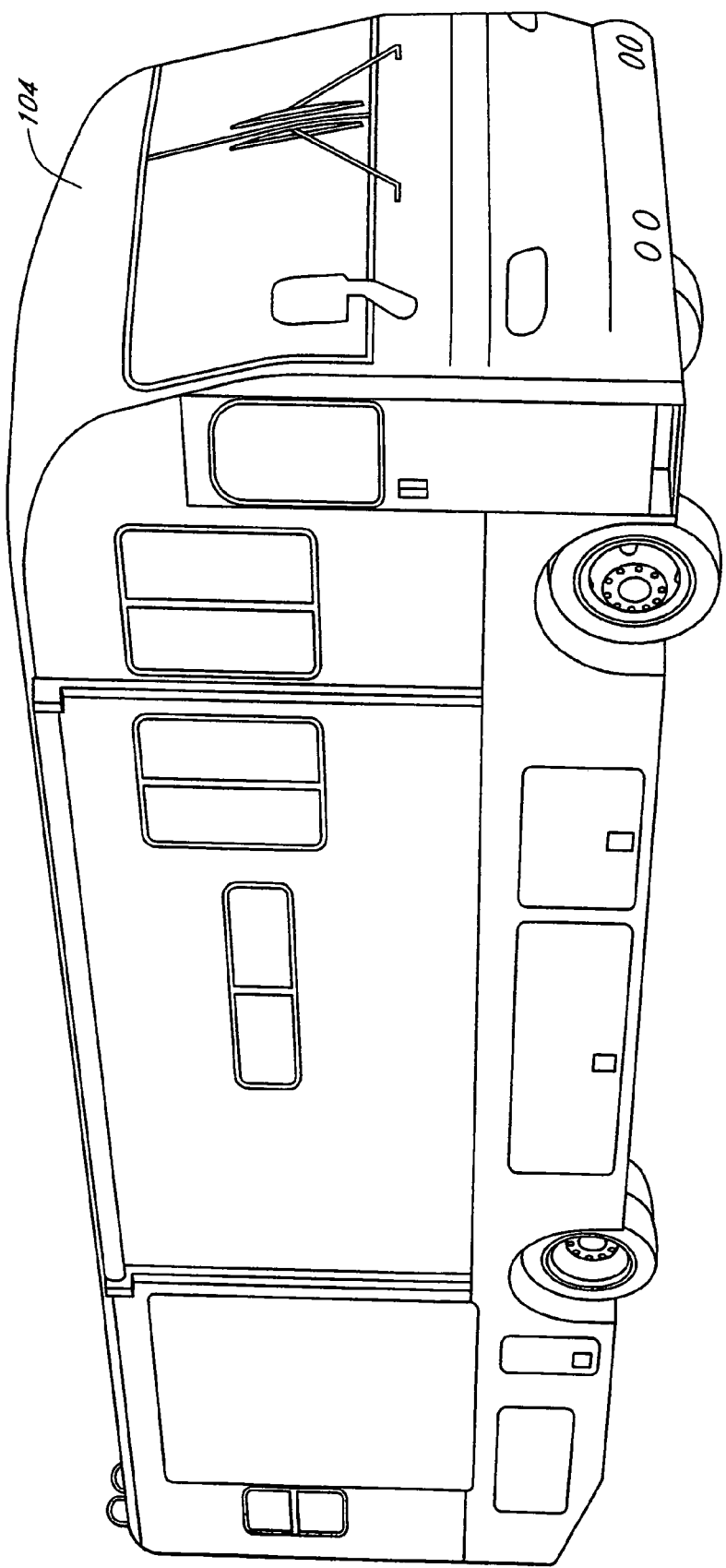
FIG. 5 is an isometric view of a completed motorhome including the vehicle frame.

Reference will now be made to the drawings wherein like numerals refer to like parts throughout. FIG. 1 shows an assembled vehicle frame 100 mounted to a preassembled chassis 102. The vehicle frame 100, mounted to the chassis 102 in the manner that will be described in greater detail below, facilitates the construction of a motorhome 104 (FIGS. 5 and 6) with a greater interior ceiling height, which in this embodiment, is approximately 7'-6". The vehicle frame 100 also facilitates building a slide-out 122 (FIGS. 3 and 6) with a greater interior height. The vehicle frame 100 also facilitates mounting of relatively massive items, such as generators, furnaces, storage and holding tanks, and the like, low to the ground so as to provide a lower center of mass for the motorhome 104. The vehicle frame 100 provides a strong three dimensional space frame 118 to inhibit twisting of the vehicle frame 100 under torsional forces such as would arise when the motorhome 104 drives over uneven terrain so as to lift or drop a road wheel 116 with respect to the other road wheels 116. The vehicle frame 100 further defines integral storage areas 106 as part of the structure of the vehicle frame 100 in a manner that will be described in greater detail below. The vehicle frame 100 further facilitates routing of a heating, ventilation, and air conditioning (HVAC) system 110 below the beltline of the chassis 102 so as to avoid intrusion of the HVAC system 110 into the interior living space of the motorhome 104 to further enable increased interior ceiling height of the motorhome 104 employing the vehicle frame 100.

Figure 2:
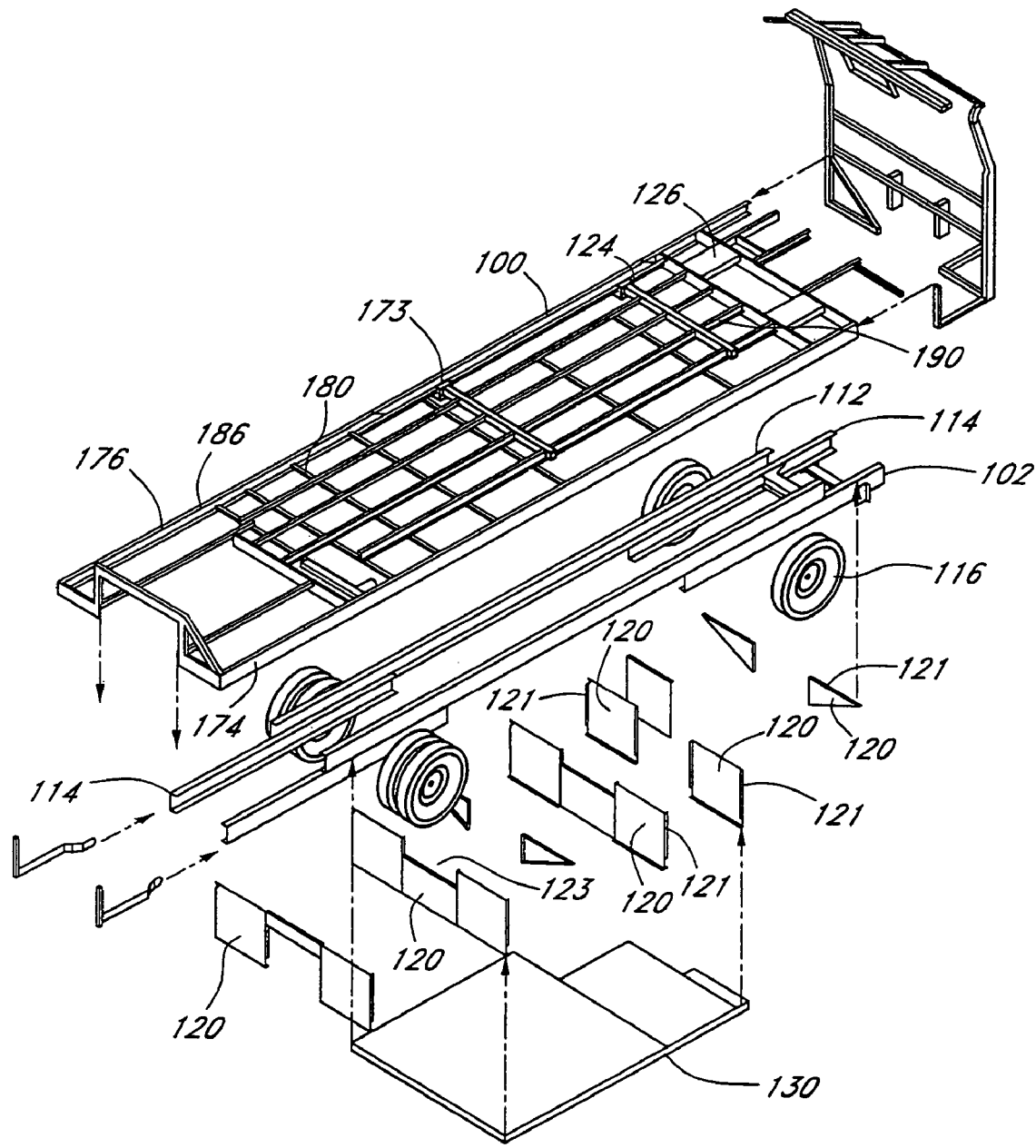
FIG. 2 is an exploded, isometric view of a partially assembled vehicle frame and a preassembled chassis.

As can be advantageously seen in FIG. 2, the chassis 102 of this embodiment, is a split rail chassis 102 of a type known in the art. The chassis 102 of this embodiment is a diesel pusher type and is available from FREIGHTLINER™, LLC. of Portland, Oreg. as Model XL. The chassis 102 comprises a pair of raised rails 112 and two pairs of lower rails 114. The raised rails 112 and lower rails 114 are rigid elongate members formed of c-channel steel approximately 2¾" by 9" and approximately ¼" thick. The raised rails 112 and the lower rails 114 are all substantially parallel. A first and second end of each raised rail 112 overlies one of the lower rails 114 over a length of approximately 402" and is attached along the overlying extent to the respective lower rail 114 in a known manner. Each pair of interconnected raised rails 112 and attached lower rails 114 are displaced a lateral distance of approximately 34" and are further interconnected by a plurality of orthogonally extending cross-beams (not illustrated) rigidly attached so as to form a ladder frame structure of a type well known in the art.

The chassis 102 also comprises a plurality of road wheels 116 with corresponding suspension, brake systems, steering, and drive mechanisms of types known in the art that are positioned at substantially the front and rear corners of the chassis 102 in the manner illustrated in FIG. 2. The road wheels 116 enable to the motorhome 104 to roll along the road and to be steered and braked in a well understood manner. The road wheels 116 are positioned adjacent the overlapping raised rails 112 and lower rails 114. The chassis 102 further comprises an engine assembly, transmission, drive axle, fuel system, and electrical system (not illustrated) of types known in the art to provide the motive power for the motorhome 104. These items are advantageously located substantially within the plane of the raised rails 112 to lower the center of mass of the chassis 102 and thus the motorhome 104.

The chassis 102 of this embodiment is highly resistant to bending along longitudinal and transverse axes. However, the chassis 102, by itself, is susceptible to twisting along the plane of the longitudinal and transverse axes due to torsional forces that arise when one or more road wheel(s) 116 at one corner of the chassis 102 is displaced either above or below the plane of the remaining road wheels 116.

The vehicle frame 100 also comprises a plurality of transversely extending bulkheads 120 illustrated in FIGS. 1 and 2. The bulkheads 120 are rigid, planar pieces of steel approximately 0.0897" thick. The bulkheads 120 are rectangular, triangular, or compound rectangular in shape as can be seen in FIG. 2. Approximately 2" of the outer edges of the bulkheads 120 are folded via known sheet metal forming techniques so as to extend generally perpendicular to the major plane of the bulkheads 120 thereby forming attachment[s] areas 121 and also so as to increase the stiffness of the bulkheads 120.

The bulkheads 120 in certain embodiments include openings 123 and are fixedly attached along the attachment areas 121 via bolts and welding in a known manner to sides of the chassis 102 and the bottom of the vehicle frame 100 to further interconnect the chassis 102 and the vehicle frame 100. The bulkheads 120 are attached to the vehicle frame 100 and the chassis 102 so as to extend downward from the vehicle frame 100 and the chassis 102. The rigid interconnection of the bulkheads 120 with the chassis 102 and the vehicle frame 100 boxes in the raised rails 112 and the lower rails 114 of the chassis with rigid plates thereby defining a three-dimensional space frame 118 enclosing the chassis 102. The rigidly interconnected vehicle frame 100 and chassis 102, boxed in by the bulkheads 120, are much more resistant to twisting forces than the chassis 102 by itself.

Figure 6:
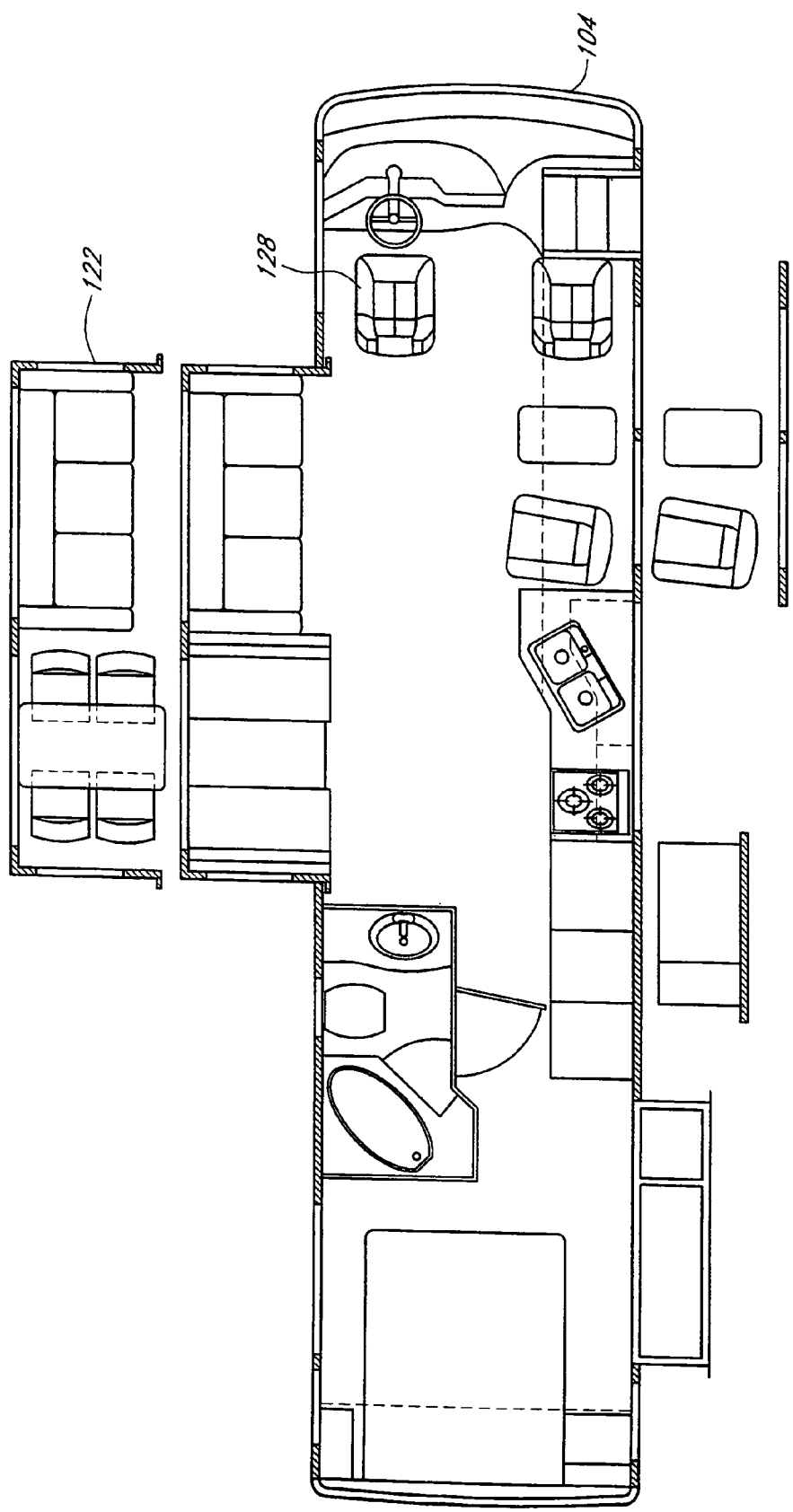
FIG. 6 is a top, section view of a motorhome illustrating one embodiment of a floor plan.

The motorhome 104 of this embodiment is assembled on and around the interconnected vehicle frame 100, the chassis 102, and the bulkheads 120. The motorhome 104 provides users a vehicle with a variety of living spaces and amenities fitted within the motorhome 104. The partitioning of the interior living spaces and fitment of interior amenities can be readily implemented by one of ordinary skill in the art. One embodiment of interior partitioning and furnishing of the motorhome 104 is illustrated in FIG. 6. The construction and features of the motorhome 104 will be described in greater detail below.

Figure 3:
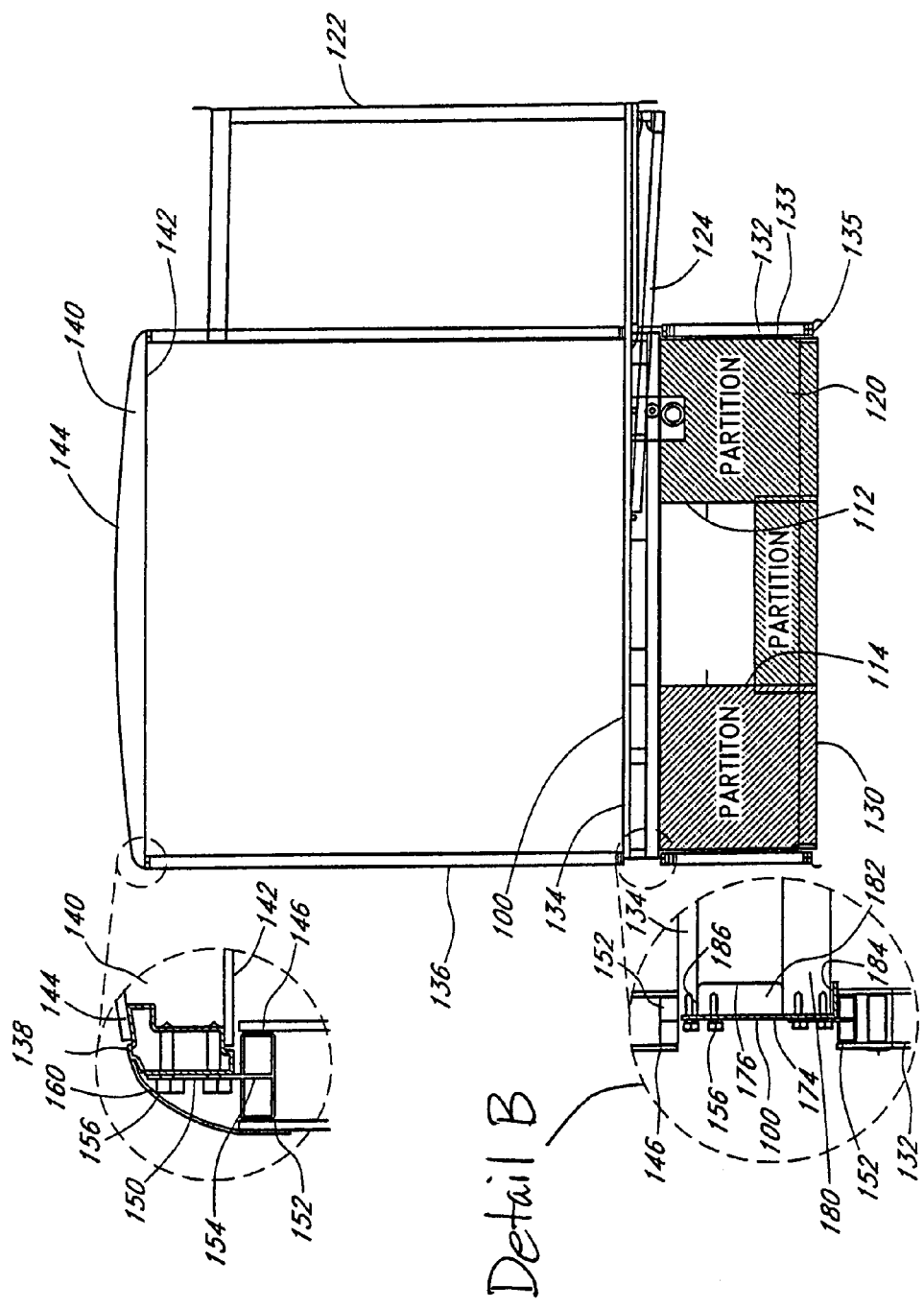
FIG. 3 is a front, section view of a motorhome with the vehicle frame and a slide-out room in the extended position.

The motorhome 104 of this embodiment comprises a slide-out 122 (FIGS. 3 and 6). The slide-out 122 is a movable structure contained within the motorhome 104 that is extensible between a retracted, travel position and an extended, live-in position. The slide-out 122 is a generally rectangular structure closed on the top and bottom and three sides and open on the remaining fourth side. The slide-out 122 of this embodiment is approximately 3½' wide, 13'-4" long, and of 6'-2" interior height. The slide-out 122, in the extended, live-in position, provides additional interior living space to the users of the motorhome 104.

In particular, the slide-out 122 provides an additional 45½ square feet of living space when the slide-out 122 is extended. A particular advantage of the slide-out 122 of this embodiment is that the interior ceiling height is approximately 6'2". This enables a person of above average height to stand up within the slide-out 122. This greatly increases the convenience and livability of motorhomes 104 employing the vehicle frame 100 which enables the slide-out 122 as herein described. As will be described in greater detail herein below, the increased living space in the main section of the motorhome 104 and in the slide-out 122 is due, in part, to the configuration of the vehicle frame 100.

The slide-out 122 includes a slide-out mechanism 124. The slide-out mechanism 124, of this embodiment, is an electromechanical assembly of a type known in the art. In alternative embodiments, the slide-out mechanism 124 is a hydraulic mechanism. The slide-out mechanism 124 extends and retracts the slide-out 122 between the retracted, travel position and the extended, live-in position in response to user commands. The slide-out mechanism 124 also physically supports the slide-out 122 in transition between the travel and live-in positions. The slide-out mechanism 124 of this embodiment offers greater user friendliness than known mechanisms for extending slide-out rooms which are hand actuated. The slide-out mechanism 124 of this embodiment is lighter and requires less maintenance than known hydraulic slide-out extension mechanisms.

The slide-out 122 and slide-out mechanism 124 are attached to the vehicle frame 100. The vehicle frame 100, when interconnected with the chassis 102 and the bulkheads 120 as previously described, is highly resistant to bending and twisting. Thus, the slide-out 122 and slide-out mechanism 124, attached to the rigid structure of the vehicle frame 100 has a low susceptibility to jamming or sticking due to flexing of the motorhome 104 as it is driven about. The slide-out 122 is also able to support a significant amount of weight, such as furniture and occupants. It should be appreciated that alternative embodiments of the invention include additional slide-outs 122.

The vehicle frame 100 also comprises seat supports 126. The seat supports 126 are rectangular structures formed from sheet steel approximately ⅛" thick and are approximately 12¹³⁄₁₆" by 22½". The seat supports 126 are fixedly attached to the vehicle frame 100 via a plurality of bolts and/or welding in a known manner adjacent the front end of the vehicle frame 100. The seat supports 126 provide a support and attachment structure for passenger seats 128 of known types. The passenger seats 128 provide seating accommodations for a driver and passengers in a known manner.

The vehicle frame 100 of this embodiment, also comprises two storage area floors 130. The storage area floors 130 are rigid composite rectangular members approximately 3¼" thick, 95" wide, and 98" long and 3¼" thick, 65" wide, and 44" long respectively. The storage area floors 130 are a composite of tube steel, foam, and plywood vacuum bonded together. The storage area floors 130 are fixedly attached along the attachment areas 121 along lower edges of the bulkheads 120 with welding and bolts in a known manner. The storage area floors 130, together with the bulkheads 120, define storage areas 106. The storage areas 106 of this embodiment extend substantially the full width of the motorhome 104. The storage areas 106 of this embodiment are two rectangular spaces approximately 95" by 98" by 25½" and 65" by 44" by 25½". The storage areas 106 of this embodiment are approximately 9" higher than comparable storage areas would be in an embodiment employing a straight rail design chassis. In particular, the raised rails 112 of the chassis 102 are 9" higher than the lower rails 114 and thus provide 9" additional height to the storage areas 106.

The storage area floor 130, comprising a rigid member fixedly attached along the length of the lower edges of the bulkheads 120, further defines the three-dimensional structural space frame 118. The structural space frame 118, comprising a plurality of rigid panels and rigid elongate members fixedly interconnected along their adjoining edges and arranged at right angles to each other, forms a structurally rigid space structure. It will be appreciated that distorting the space frame 118 would require separation of the joints between component members and/or bending of the rigid members. This further increases the torsional rigidity of the interconnected vehicle frame 100, chassis 102, bulkheads 120, and storage area floor 130 assembly.

The vehicle frame 100 also comprises a plurality of storage area doors 132 (FIG. 3). In one embodiment, the storage area doors 132 are rectangular, rigid structures approximately 2⅜" thick by 25½" by 8' long. The storage area doors 132 are a vacuum bonded composite of fiberglass, plywood, block foam insulation, and aluminum. The storage area doors 132 enclose the storage areas 106. The storage area doors 132 have an insulation value of R11 and thus provide thermal insulation to the interior of the storage areas 106. R11 is a measure of the thermal insulation properties of the storage area doors 132 according to a standard scale well known in the art and corresponds to the insulative value of a fiberglass batting approximately 3.5" thick. The storage area doors 132 also retain objects placed in the storage areas 106 from falling out as the motorhome 104 moves about or from unintentional removal by curious children or thieves. The storage area doors 132 also inhibit intrusion of pests and windblown dirt, dust, and rain into the interior of the storage areas 106 thereby befouling the interior and possibly damaging items stored therein.

The storage area doors 132 are hingedly attached along either a top edge or a vertical edge thereof to the vehicle frame 100. The storage area doors 132 can be raised to an elevated position to facilitate placing items into or removing items from the interior of the storage areas 106. The storage area doors 132 are further positionable in a closed position to seal the interior of the storage areas 106. The storage area doors 132, in a preferred embodiment, further comprise weather seals 133 and a latching mechanism 135. The weather seals 133 are resilient, tubular structures of a type known in the art that are attached with adhesive to the periphery of the storage area doors 132 on the side of the storage area doors 132 facing the motorhome 104. The weather seals 133 improve the seal between the storage area doors 132 and the storage areas 106 in a known manner. The latching mechanism 135 is a lock mechanism of a type well known in the art which lockably secures the storage area doors 132 in the closed position to further inhibit unintentional opening of the storage area doors 132.

As is illustrated in FIGS. 1 and 2, the vehicle frame 100 comprises a floor section 101 which is formed from a plurality of L-channel elongate members 174, C-channel elongate members 176, and square tubing elongate members 180. The L-channel elongate members 174 of this embodiment are approximately 1½" wide, 6⅜" tall, and 34' long and are made of sheet steel approximately 0.0897" thick. The C-channel elongate members 176 of this embodiment are approximately 1½" wide, 3½" tall, and 34' long and are made of sheet steel approximately 0.0897" thick. The square tubing elongate members 180 of this embodiment are approximately 2" square in cross section, approximately 97" long, and are made of sheet steel with a wall thickness of approximately ⅛". It should be appreciated that the configurations of the elongate members 174, 176, 180 herein described are simply one embodiment and that other configurations of the elongate members 174, 176, 180 could be employed by one of skill in the art without detracting from the spirit of the present invention.

The L-channel elongate members 174 and the C-channel elongate members 176 extend substantially the length of the vehicle frame 100. The C-channel elongate members 176 define a cavity 182 and the L-channel elongate members 174 define an inside corner 184 as illustrated in FIG. 3, Detail B. The square channel elongate members 180 are fixedly attached via welding in a known manner to the L-channel elongate members 174 such that a first and second end of each square channel elongate member 180 is flush with the inside corner 184 of an L-channel elongate member 174 such that the two L-channel channel elongate members 174 are parallel, the plurality of square channel elongate members 180 extend perpendicular to each of the L-channel elongate members 174, and the plurality of square channel elongate members 180 are thus all respectively parallel.

A C-channel elongate member 176 is fixedly attached via welding in a known manner to each L-channel elongate member 174 such that the C-channel elongate member 176 abuts a first or second end of the square channel elongate members 180 and further such that the cavity 182 of the C-channel elongate member 176 is adjacent the L-channel channel elongate member 174. Thus, the L-channel elongate members 174 enclose the cavities 182 and thus create closed structures. The abutment of the C-channel elongate members 176 against the square channel elongate members 180 inhibits displacement and bending of the square channel elongate members 180 with respect to the L-channel 174 and C-channel 176 elongate members. The interconnection of the L-channel 174 and C-channel 176 elongate members also defines two shelves 186 extending the length of the L-channel 174 and C-channel 176 elongate members. The interconnected L-channel 174, C-channel 176, and square channel 180 elongate members thus define a rigid ladder frame structure that is highly resistant to bending and flexing.

In one embodiment, additional L-channel 174 and C-channel 176 elongate members are interconnected to form composite-channel elongate members 190. The composite-channel elongate members 190 are formed by positioning an L-channel elongate member 174 overlying the C-channel elongate member 176 such that the cavity 182 of the C-channel elongate member 176 is immediately below and adjacent the inside corner 184 of the L-channel elongate member 174 and such that the L-channel 174 and C-channel 176 elongate members are aligned with each other. The L-channel 174 and C-channel 176 elongate members are then attached via welding in a known manner to form the composite-channel elongate members 190. The composite-channel elongate members 190 extend longitudinally and are positioned so as to be parallel to, aligned with, and between the raised rails 112. The composite-channel elongate members 190 are substantially the same length as the raised rails 112.

The motorhome 104 also comprises a coach floor 134. The coach floor 134 of this embodiment is formed from a plurality of rectangular pieces of ¾" tongue and groove plywood, placed so as to abut each other in a coplanar fashion. The coach floor 134 is a planar, rectangular structure approximately 97¼" by 420⅝". The coach floor 134 is placed directly on the floor section 101 of the vehicle frame 100 so as to rest on the shelves 186. The coach floor 134 is attached to the floor section 101 of the vehicle frame 100 via a plurality of screws and adhesive in a known manner. The coach floor 134 provides a continuous flooring surface for the motorhome 104 to support occupants and furniture in the interior of the motorhome 104. The coach floor 134 also provides a support and attachment surface for padding, carpeting, tile, linoleum, or other interior floor finishings.

As is illustrated in FIGS. 1 and 2, the floor section 101 of the vehicle frame 100 is mounted such that the bottom surface of the floor section 101 is positioned directly on the raised rails 112. As such, the coach floor 134 is elevated above the raised rails 112 of the chassis 102 by a distance substantially equal to the thickness of the members comprising the floor section 101. This results in the upper surface of the coach floor 134 being located lower than the upper surfaces of floors in other motorhomes thereby allowing for greater available interior height in the motorhome 104 and also in a lowering of the center of gravity of the motorhome 104 of this embodiment.

Similarly, as is illustrated in FIGS. 2 and 3, the slide-out mechanism 124 is mounted within the floor section 101 of the vehicle frame 100 so as to extend through openings 173 defined in at least one of the C-channel 176 elongate members. As such, the floor of the slide-out 122 is located at approximately the same height as the floor 134 of the main part of the motorhome 104. This results in the floor of the slide-out 122 of the motorhome 104 being located lower than the floor of slide-outs in motorhomes of the prior art. Hence, the height of the available space within the slide-out 122 within the motorhome 104 is further increased.

Moreover, the floor section 101 is attached to the upper surface of the raised rails and is also connected to the sides and the bottom side of the raised rails 112 and the lower rails 114 via the bulkheads 120 that are also connected to the floor section 101. As is illustrated in FIGS. 1 and 2, the floor section 101 is coupled to the raised rails 112 and the lower rails 114 at periodic intervals along the length of the floor section 101 of the vehicle frame 100. By interconnecting the floor section 101 to the raised rails 112 and the lower rails 114 using the space frame 118 that encloses the raised rails 112 and the lower rails 114 along the top and sides and, in some instances, the bottom, twisting of the frame 100 when the road wheels 116 of the motorhome 104 are vertically displaced from each other is reduced. Further, forming the floor section 101 so that the longitudinal members are interconnected by lateral members further reduces twisting or bending of the vehicle frame 100 when the front and rear road wheels 116 are displaced with respect to each other.

The motorhome 104 also comprises coach walls 136. The coach walls 136 are generally planar, rectangular structures approximately 2⅜" thick, 90" tall, and 416⅞" long. The coach walls 136 are made from a laminated composite of fiberglass, phenolic plywood, 2" block foam insulation, and interior decor panel which are vacuum bonded together with an aluminum frame. The coach walls 136 provide physical structure to the motorhome 104. The coach walls 136 also insulate the interior of the motorhome 104 against heat transfer and sound. The coach walls 136, of this embodiment, are approximately ½" thicker than walls typically used in the art and have a higher insulation rating than other known walls. The insulation rating of the coach walls 136 of this embodiment is R11. The coach walls 136 also comprise various openings to accommodate windows, doors, slide-outs 122, vents, etc. the formation and placement of which are readily realized by one skilled in the art.

The motorhome 104 also comprises a coach roof 140. The coach roof 140 is a planar, rectangular structure approximately 97¼" wide by 371" long. The coach roof 140 is formed from a laminate of a rubber outer roofing layer, plywood, ultra-light high-density block foam insulation core, and a one-piece carpeted inner ceiling layer bonded with an extruded aluminum welded superstructure 138.

The coach roof 140 is substantially planar along a lower face 142 and convexly curved along an upper face 144. The coach roof 140 is approximately 5½" thick at the thickest region near the center of the coach roof 140 and convexly tapers off to the sides and towards the front and back to a thickness of approximately 2½" along the edges of the coach roof 140. Thus, the upper face 144 of the coach roof 140 has a crowned contour. The crowned contour of the upper face 144 of the coach roof 140 inhibits pooling of water and accumulation of snow and debris on the coach roof 140. Thus, the motorhome 104, fitted with the coach roof 140 as herein described, can more readily shed water, snow, and debris and minimize the deleterious effects of retaining water or debris in contact with the materials of the coach roof 140. The crowned contour of the upper face 144 also improves the structural durability of the coach roof 140 because avoiding accumulation of water and snow will minimize the vertical weight loads of heavy snow or water which could potentially otherwise bow the coach roof 140 leading to distortion, cracking, or separation of joints. The crowned contour of the coach roof 140 also improves the aesthetics of the motorhome 104 because more readily shedding debris helps to minimize adhesion of dirt and thus maintains a cleaner appearance to the exterior of the motorhome 104.

The motorhome 104 also comprises a plurality of attachment assemblies 146. The attachment assemblies 146 are extruded from aluminum alloy in a known manner. The attachment assemblies 146 are elongate members that extend substantially the length of the motorhome 104. The attachment assemblies 146 interconnect the coach walls 136, the storage area doors 132, the coach roof 140, and the vehicle frame 100 in a manner that will be described in greater detail below.

As viewed in a perpendicular cross-section (as shown in FIG. 3) the attachment assemblies 146 comprise a planar attachment area 150, a hollow rounded, closed rectangular channel 152, and an inner partition 154. It should be appreciated that the attachment assemblies 146 are unitized, extruded assemblies and the planar attachment area 150, the rectangular channel 152, and the inner partition 154 herein described are regions of the attachment assemblies 146 and are materially and structurally continuous with each other.

The attachment area 150 is a rectangular, planar region of the attachment assemblies 146 approximately 2⅛" by 371" and extends vertically from the rectangular channel 152 approximately 2⅛" and provides a convenient structure for attaching the attachment assemblies 146. The rectangular channel 152 is a closed, structural element of the attachment assemblies 146 approximately 2" by ¾" and increases the stiffness of the attachment assemblies 146 to bending and twisting according to well understood structural principles. The inner partition 154 extends vertically approximately ¾"0 within the rectangular channel 152 and spans and internally partitions the rectangular channel 152 and further stiffens the attachment assemblies 146. The inner partition 154 is substantially coplanar with the attachment area 150.

The attachment assemblies 146 are fixedly attached to an upper and lower edge of the coach walls 136 such that the rectangular channels 152 are positioned between outer layers of the coach walls 136 as shown in FIG. 3, details A and B. The attachment assemblies 146 are further attached to the coach walls 136 such that the rectangular channels 152 are positioned flush with upper and lower edges of the coach walls 136. The attachment areas 150 of the attachment assemblies 146 thus extend beyond the edges of the coach walls 136 approximately 2⅛". The attachment assemblies 146 are attached to the coach walls 136 with an adhesive, such as MA425 from Plexus of Danvers, Mass. in a known manner.

The coach walls 136 with the attachment assemblies 146 attached are placed on the coach floor 134 such that the attachment area 150 is adjacent the edge of the coach floor 134 and the rectangular channel 152 rests on the coach floor 134. This placement of the coach walls 136 and attached attachment assemblies 146 results in the edge of the coach floor 134 occupying the corner defined between the attachment area 150 and the rectangular channel 152. This placement further results in the coach walls 136 straddling the coach floor 134 such that approximately half of the thickness of the coach walls 136 is overlying the coach floor 134. This enables the coach walls 136 to partially rest on the coach floor 134 for additional vertical load support while still maintaining clearance for recessed attachment of the coach walls 136 such that the attachment devices do not protrude beyond the outer face of the coach walls 136.

The attachment assemblies 146 are attached to the coach floor 134 and the vehicle frame 100 via a plurality of screws 156 positioned approximately every 5" along the length of the attachment assemblies 146. The screws 156 of this embodiment are 10–16×1" of a type known in the art and installed in a known manner.

The coach roof 140 is positioned on the coach walls 136 such that the attachment areas 150 are adjacent the edges of the coach roof 140 and such that the coach roof 140 partially overlies the coach walls 136. The attachment areas 150 are attached to the coach roof 140 via a plurality of screws 156 placed approximately every 5" along the length of the edges of the coach roof 140.

The motorhome 104 also comprises a plurality of trim pieces 160. The trim pieces 160 are elongate members of semi-rigid material, such as vinyl, approximately 20" long, 5" wide and 1/16" thick. The trim pieces 160 are arcuate in cross section and are attached to the aluminum superstructure 138 via a friction fit achieved in a known manner. The trim pieces 160 are positioned to abut each other so as to extend the full length of the coach roof 140. The outer rubber roofing layer of the coach roof 140 overlies the trim pieces 160.

The trim pieces 160 cover the screws 156 attaching the coach roof 140 to the coach walls 136. The trim piece 160 obscures the view of the screws 156 to thereby improve the aesthetics of the motorhome 104. The trim piece 160 also shields the screws 156 and the upper edges of the coach walls 136 from rain, snow, and debris. Thus the trim piece 160 inhibits accumulation of water and debris adjacent the screws 156 and the upper edges of the coach walls 136 so as to inhibit corrosion and fouling of the screws 156 and the coach walls 136. The trim piece 160 also inhibits intrusion of water and debris into the interior of the coach walls 136 which could compromise the strength and structural integrity of the coach walls 136.

Figure 4:
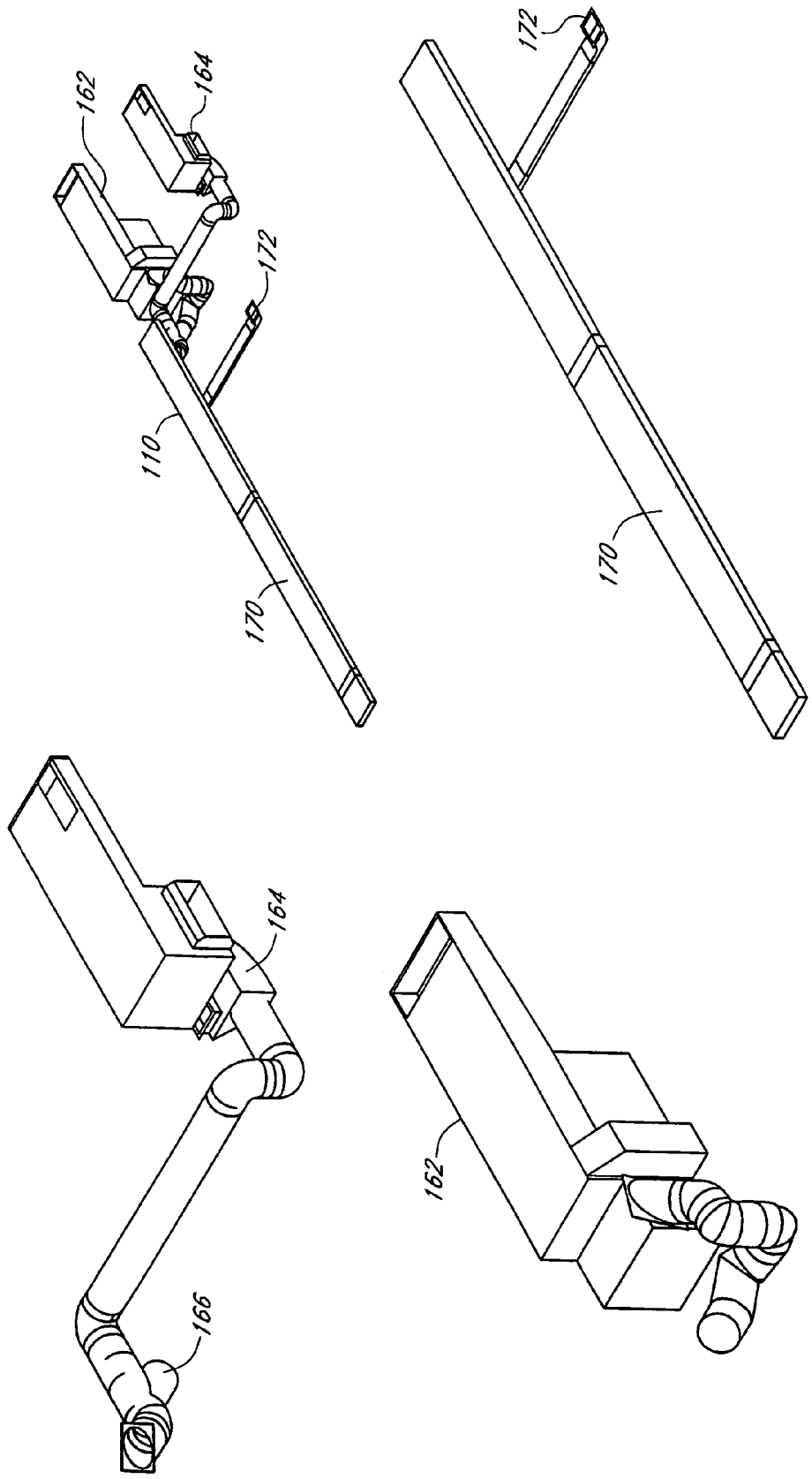
FIG. 4 is an assembled and exploded view of a heating, ventilation, and air conditioning (HVAC) system.

The HVAC system 110 comprises an air conditioning unit 162, a furnace 164, a manifold 166, a duct 170, and at least one register 172 as illustrated in FIG. 4. The air conditioning unit 162 cools incoming air and provides the cool air for cooling the interior of the motorhome 104 in a known manner. The furnace 164 warms incoming air and provides warm air for warming the interior of the motorhome 104 also in a known manner. The air conditioning unit 162 or the furnace 164 can be activated in response to user commands in a known manner. The manifold 166 receives air from both the air conditioning unit 162 and the furnace 164 and routes the air to the duct 170. The duct 170 extends substantially the length of the interior of the motorhome 104. The duct 170 carries the warm or cool air to at least one register 172. The registers 172 communicate with the duct 170 in appropriate locations and direct cool or warm air, received from the duct 170, into the interior of the motorhome 104. The registers 172 includes a screen to inhibit objects falling into the interior of the registers 172 and the duct 170.

The HVAC system 110, of this embodiment, is located within or below the plane of the chassis 102. Positioning the air conditioning unit 162 and the furnace 164, which are both relatively heavy items, within or below the plane of the chassis 102 further lowers the center of mass of the motorhome 104 to thereby improve the road handling of the motorhome 104. The placement of the HVAC system 110 of this embodiment also distances the duct 170 and registers 172 from the coach roof 140. Other known motorhome designs route HVAC ducting adjacent the roof of the vehicle which exposes the cool air to thermal heating from sunlight incident on the roof of the vehicle. In the motorhome 104 of this embodiment, the duct 170, register 172, and air conditioning unit 162 are shaded from incident sunlight by the motorhome 104. Thus, the HVAC system 110 can more efficiently provide cool air to the interior of the motorhome 104. This improves the occupant's comfort in hot weather and reduces fuel costs for powering the HVAC system 110.

A further advantage of the HVAC system 110 of this embodiment is that the air conditioning unit 162, duct 170, and register 172 which carry cool air are located below the living space of the motorhome 104. As is well understood by those of ordinary skill in the art, a cooler than ambient surface, such as the air conditioning unit 162, duct 170, and register 172 induces liquid water to condense out of the atmosphere if the temperature of the surface is at or below the dew point. When air conditioning ducting is routed above the living space of a motorhome, liquid water that condenses on the ducting is drawn downwards by gravity. This can induce liquid water to intrude into walls, ceilings, and other interior materials. It can be appreciated that liquid water can readily damage the structural integrity of typical motorhome building materials. Liquid water can also stain and warp interior materials, damaging the aesthetics of a motorhome. The air conditioning unit 162, duct 170, and registers 172 of this embodiment are positioned below the living space of the motorhome 104 and thus water that condenses out during use of the HVAC system 110 is drawn downwards and away from the motorhome 104 without intruding into the living spaces of the motorhome 104.

An additional advantage of the HVAC system 110 of this embodiment is that placement of the HVAC system 110 adjacent and below the beltline of the chassis 102 obviates the need to place portions of an HVAC system on the roof of the motorhome 104. Other known HVAC systems place portions of the system on the exterior roof of a motorhome. This requires that the major plane of the outer roof be lowered with respect to the roof of the present invention so as to maintain the overall height restrictions previously mentioned. Lowering the exterior roof height results in corresponding lowering of the interior ceiling height and a corresponding reduction in the interior space and livability of such a motorhome.

Yet another advantage of the HVAC system 110 of this embodiment is that placement of the HVAC system 110 adjacent and below the beltline of the chassis 102 distances the furnace 164 and air conditioning unit 162 from the interior of the motorhome 104. The air conditioning unit 162 and furnace 164 are relatively noisy in operation. Placing the HVAC system 110 outside the interior of the motorhome 104 distances the noise sources of the air conditioning unit 162 and the furnace 164 and thus provides a quieter, more comfortable living environment for users of the motorhome 104.

Another advantage of the vehicle frame 100 is that the interconnected vehicle frame 100, bulkheads 120, and storage area floor 130 together define the rigid, three-dimensional space frame 118. The space frame 118 can be readily constructed as a stand-alone structural entity separate from the chassis 102 as will be well understood by one skilled in the art following consideration of the specification herein disclosed. Assembling the space frame 118 independently from the chassis 102 facilitates assembling the space frame 118 onto the chassis 102 after the space frame 118 is completed. This facilitates a just-in-time delivery of the chassis 102 and thus avoids tying up valuable capital in the manufacture of the motorhome 104. The chassis 102 is a significant material cost of the motorhome 104 and it will be appreciated that a just-in-time delivery can reduce the construction costs of the motorhome 104, thus providing lower cost to the end consumer and/or increased profit margins for the manufacturer of the motorhome 104.

Although the preferred embodiments of the present invention have shown, described and pointed out the fundamental novel features of the invention as applied to those embodiments, it will be understood that various omissions, substitutions and changes in the form of the detail of the device illustrated may be made by those skilled in the art without departing from the spirit of the present invention. Consequently, the scope of the invention should not be limited to the foregoing description but is to be defined by the appended claims.

What is claimed is:

1. A motorhome, comprising:
    a chassis having at least two parallel interconnected chassis members having top, bottom, and side surfaces;
    a floor section that is mounted to the top surface of the chassis members;
    a storage floor positioned below the bottom surface of the chassis members;
    a plurality of vertically arranged structural members that interconnect the storage floor to the floor section, wherein each of the vertically arranged structural members defines a plane that is substantially perpendicular to the chassis members such that the floor section, the storage floor, and the plurality of vertically arranged structural members define one or more spaces that are at least partially enclosed, and wherein each of the vertically arranged structural members attaches to the side surface of at least one of the chassis members thereby providing a three-dimensional space frame structure about at least one of the chassis members;
    wherein the plurality of vertically arranged structural members includes at least one bulkhead panel that extends laterally beyond the at least two chassis members, wherein the at least one bulkhead panel comprises a rectangular shaped panel having top and bottom edges, and wherein the rectangular shaped panel defines a cutout having side edges that attach to the outermost surfaces of the at least two chassis members, and wherein the top edge attaches to the floor section and the bottom edge attaches to the storage floor.

2. The motorhome of claim 1, wherein the plurality of vertically arranged structural members includes at least one bulkhead panel that extends laterally outward from one of the outermost chassis member.

3. The motorhome of claim 2, wherein the at least one bulkhead panel comprises a rectangular shaped panel having top, side, and bottom edges, such that the top edge attaches to the floor section, the side edge attaches to the outermost surface of one of the chassis members, and the bottom edge attaches to the storage floor.

4. The motorhome of claim 1, wherein the cutout is defined along the top edge of the rectangular shaped panel.

5. The motorhome of claim 1, wherein the cutout is defined along the bottom edge of the rectangular shaped panel.

6. The motorhome of claim 1, wherein the side edges of the cutout define folds that are generally perpendicular to the plane of the bulkhead panel, such that the folds facilitate attachment of the side edges to the outermost surfaces of the at least two chassis members.

* * * * *

UNITED STATES PATENT AND TRADEMARK OFFICE
CERTIFICATE OF CORRECTION

| | | |
|---|---|---|
| PATENT NO. | : 7,021,699 B2 | Page 1 of 1 |
| APPLICATION NO. | : 10/776025 | |
| DATED | : April 4, 2006 | |
| INVENTOR(S) | : Johnnie Robert Crean | |

It is certified that error appears in the above-identified patent and that said Letters Patent is hereby corrected as shown below:

On Title Page Item (56)
At Page 2, Column 2, Line 2, under Foreign Patent Documents, please delete "10/1981" and insert therefore, --10/1982--.

At Column 1, Line 13, after "height" please delete "0".

At Column 3, Line 43, please delete "comer" and insert therefore, --corner--.

At Column 5, Line 61, please delete "comers" and insert therefore, --corners--.

At Column 6, Line 12, please delete "comer" and insert therefore, --corner--.

At Column 9, Line 13, after "L-channel" please delete "channel".

At Column 9, Line 24, before "elongate" please delete "channel".

At Column 9, Line 45, please delete "comer" and insert therefore, --corner--.

At Column 11, Line 56, after "3/4" please delete "0".

At Column 12, Line 12, please delete "comer" and insert therefore, --corner--.

At Column 12, Line 37, please delete "20"" and insert therefore, --20'--.

Signed and Sealed this

Twenty-first Day of November, 2006

JON W. DUDAS
*Director of the United States Patent and Trademark Office*